United States Patent [19]

Leland

[11] Patent Number: 5,460,642
[45] Date of Patent: Oct. 24, 1995

[54] AEROSOL REDUCTION PROCESS FOR METAL HALIDES

[75] Inventor: John D. Leland, Corvallis, Oreg.

[73] Assignee: Teledyne Industries, Inc., Albany, Oreg.

[21] Appl. No.: 210,491

[22] Filed: Mar. 21, 1994

[51] Int. Cl.$^6$ ................................................. C22B 34/00
[52] U.S. Cl. ........................... 75/617; 75/618; 75/619; 75/620; 266/168; 266/177; 266/202; 266/905; 432/66; 432/67; 432/71
[58] Field of Search ...................... 75/616, 617, 618, 75/619, 10.14, 10.18; 266/168, 177, 905, 202; 432/66, 67, 71

[56] References Cited

U.S. PATENT DOCUMENTS

| | | | |
|---|---|---|---|
| 2,760,858 | 8/1956 | Findlay et al. | 419/31 |
| 2,762,093 | 9/1956 | Hood | 164/46 |
| 2,763,760 | 9/1956 | Buckle | 110/191 |
| 2,766,111 | 10/1956 | Singleton | 75/620 |
| 2,773,759 | 12/1956 | Hood | 75/617 |
| 2,782,118 | 2/1957 | Hood | 75/615 |
| 2,789,896 | 4/1957 | Coffer | 75/614 |
| 2,801,915 | 8/1957 | Erasmus | 75/395 |
| 2,816,828 | 12/1957 | Benedict et al. | 75/615 |
| 2,826,491 | 3/1958 | Findlay | 75/617 |
| 2,828,199 | 3/1958 | Findlay | 75/437 |
| 2,828,201 | 3/1958 | Findlay | 75/616 |
| 2,860,966 | 11/1958 | Atkinson | 75/615 |
| 2,870,007 | 1/1959 | Boettcher et al. | 75/617 |
| 2,889,221 | 6/1959 | Singleton | 75/620 |
| 2,895,852 | 7/1959 | Loonam | 72/38 |
| 2,916,359 | 12/1959 | Ellis, Jr. et al. | 422/244 |
| 2,922,710 | 1/1960 | Dombrowski et al. | 75/619 |
| 2,999,735 | 9/1961 | Reuschel | 427/588 |
| 3,014,797 | 12/1961 | Elischer | 75/395 |
| 3,049,440 | 8/1962 | Kesler | 427/253 |
| 3,085,071 | 4/1963 | Bailey | 528/413 |
| 3,085,072 | 4/1963 | Zima | 521/33 |
| 3,085,073 | 4/1963 | Lintner | 521/60 |
| 3,114,611 | 12/1963 | Ross | 422/189 |
| 3,223,519 | 12/1965 | Schippereit | 75/10.18 |
| 3,318,688 | 5/1967 | Klimaszewski | 75/67 |
| 3,523,816 | 8/1970 | Cave | 423/350 |
| 3,764,535 | 10/1973 | Schlicht | 252/48.2 |
| 3,775,091 | 11/1973 | Clites et al. | 75/10.14 |
| 3,966,460 | 6/1976 | Spink | 75/618 |
| 4,058,668 | 11/1977 | Clites | 373/76 |
| 4,242,136 | 12/1980 | Ishizuka | 75/618 |
| 4,441,925 | 4/1984 | Ishizuka | 75/619 |
| 4,738,713 | 4/1988 | Stickle et al. | 75/10.18 |
| 4,830,665 | 5/1989 | Winand | 164/475 |
| 4,838,933 | 6/1989 | Paillere et al. | 164/471 |
| 4,897,116 | 1/1990 | Scheel | 75/616 |
| 4,923,508 | 5/1990 | Diehm et al. | 75/10.14 |
| 4,985,069 | 1/1991 | Traut | 75/10.18 |
| 5,021,221 | 6/1991 | Gould et al. | 422/129 |
| 5,032,176 | 7/1991 | Kametani et al. | 422/129 |
| 5,071,472 | 12/1991 | Traut et al. | 75/10.18 |
| 5,098,471 | 3/1992 | Abodishish et al. | 75/614 |
| 5,147,451 | 9/1992 | Leland | 75/620 |

*Primary Examiner*—Ngoclan Mai
*Attorney, Agent, or Firm*—Shoemaker and Mattare, Ltd.

[57] ABSTRACT

A method and apparatus for continuously producing metals such as zirconium, hafnium, titanium, niobium, vanadium, silicon and tantalum. The corresponding metal halide is reacted with a metallic reducing agent such as aluminum, calcium, magnesium and sodium in a reactor where the reaction takes place at a temperature where the metal reducing agent is below its vaporization temperature and where the metal halide is above its vaporization temperature. The metal formed by the reaction is recovered from the reactor by collecting it in a pool of molten product metal contained in a cold wall induction heated receptacle in the reactor from which the metal product is removed.

10 Claims, 1 Drawing Sheet

AEROSOL REDUCTION PROCESS FOR METAL HALIDES

FIELD OF INVENTION

This invention relates generally to the field of extractive metallurgy, and more specifically, to the production of metals via the reduction of metal halides by metallic reducing agents.

BACKGROUND OF THE INVENTION

In the text hereinafter, specific reference is made to the reduction of zirconium tetrachloride, ZrCl4, by aerosol sodium, Na, to form elemental Zr and byproduct NaCl. Many other metals in addition to zirconium may be produced according to this invention. Metal halide compounds to which this invention applies include $HfCl_4$, $HfF_4$, $HfI_4$, $NbCl_5$, $SiI_4$, $SiCl_4$, $SiF_4$, $TaCl_5$, $TiBr_4$, $TiCl_4$, $TiF_4$, $TiI_4$, $UF_6$, $VCl_3$, $ZrBr_4$, $ZrCl_4$, $ZrF_4$, and $ZrI_4$.

Metallic reducing agents which are transferred in the practice of this invention applies include Al, Ca, Mg, and Na.

Presently, the metals listed are produced by several processes, each with its own set of shortcomings.

Zr, Ti, and Hf are produced by the Kroll process, which is described in U.S. Pat. No. 2,205,854. This process is time consuming and expensive. From the input of $ZrCl_4$ and Mg to the output of elemental Zr metal may take up to 10 days.

Additionally, the product of the Kroll process is a spongy form of the product metal, which readily absorbs undesirable gases such as oxygen and nitrogen from the atmosphere. The "sponge" must be crushed down to a small size (¾" particles), visually inspected for "burnt" particles high in oxygen and nitrogen, then blended and compacted before finally it is melted to produce homogeneous metal. Incremental improvements to the Kroll process are described in U.S. Pat. Nos. 2,763,760; 2,860,966; 2,922,710; 3,114,611; 3,318,688; 3,966,460; 4,242,136; 4,441,925; 4,897,116; and 5,098,471.

Nb, V, and Ta are frequently produced by the "thermite" process, in which the oxide of the product metal is exothermically reacted with a metallic reducing agent whose oxide is more thermodynamically stable than that of the product metal. Typically, powdered aluminum (for example) is blended with an oxide such as $Nb_2O_5$ (for example), and the mixture is ignited to produce Nb and $Al_2O_3$.

The product metal in most thermite reactions is a "derby" of homogenous metal, but the derbys typically must be melted several times under very high vacuum conditions to obtain acceptably pure metal. Additionally, thermite processes are limited in the maximum amount of metal which can be produced in a single batch for thermodynamic reasons known to those skilled in the art of extractive metallurgy; maximum batch sizes are only several hundred pounds. Typical thermite processes are described in U.S. Pat. Nos. 2,789,896; 2,801,915; 3,014,797; and 3,764,535.

One method by which very pure silicon is produced is by the thermal decomposition of a silicon halide. Such decomposition methods are taught in U.S. Pat. Nos. 2,889,221; 2,895,852; 2,916,359; 2,999,735; 3,049,440; and 3,523,816.

The other metals to which this invention applies are produced by methods similar to those described. In general, all of the metals are produced in batch, as opposed to continuous processes, and each requires substantial processing after the final chemical reduction reaction produces elemental metal, in order to obtain an ingot of homogeneous metal of controllable purity.

The limitations present in the present production methods for Zr, Ti, Hf, Si, and the other metals listed are well known to those skilled in the art. The literature in this area of extractive metallurgy covers numerous approaches; some represent continuous variations on the present production methods, while others are progressively more theoretical.

One class of approaches for improved production methods for many of these metals are so-called "flame reduction" processes. In these processes, the metal halide is vaporized, as is the metallic reducing agent (typically Na or Mg). The two gases are brought together in some type of burner arrangement, which to some extent may resemble a modern blowtorch, stovetop, or similar burner. The chemical reaction is extremely rapid, exothermic, and luminescent; hence the designation. A typical overall equation for such reactions is:

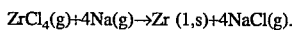

$$ZrCl_4(g)+4Na(g)\rightarrow Zr\ (l,s)+4NaCl(g).$$

This type of approach is attractive for many reasons. If such a reactor could be made to operate continuously, it could be much smaller than presently used equipment, with correspondingly lower initial and operating costs. By virtue of operating continuously, such a reactor could make far purer metal than present equipment, since it would not be periodically opened to the atmosphere. Also since both reactants could be metered to the reactor in controlled amounts, the metallic reducing agent would be more efficiently used. Most present methods add up to 25% excess metallic reducing agent to drive the reaction toward completion. The product metal would be more uniform, since there would be far fewer start up/shut down periods, when the dominant reaction mechanisms may vary, causing differences in the product. Finally, a continuous process that produced homogeneous ingot metal would eliminate a large number of subsequent processing steps presently required after the reduction reaction which initially yields unconsolidated elemental metal.

Typical flame reduction processes are described in U.S. Pat. Nos. 2,760,858; 2,826,491; 2,828,199; and 2,828,201 by Findlay; in 2,762,093; 2,773,759; and 2,782,118 by Hood; in 2,766,111 by Singleton; in 2,816,828 by Benedict; in 2,870,007 by Boettcher; in 3,085,071-3 by Griffiths; in 4,830,665 by Winand; in 5,021,221 by Gould; and in 5,032,176 by Kametani. However, none of these processes has achieved industrial acceptance.

There are three major reasons for the failure of these prior art flame reduction processes to compete with the existing production methods for the metals in question. The first is that, in order to vaporize the commonly available metallic reducing agents Na and Mg, very high temperatures must be employed, e.g., up to 1400° C. These temperatures are difficult to achieve by current industrial methods, given the additional requirements for atmospheric purity, flow control, and other complications.

Another problem is that since the metallic reducing agent is vaporous, even higher temperatures are generated during the reaction (up to 2000° C.), and frequently the torch apparatus is consumed or melted to an undesirable degree. The third problem is that metal produced in flame reduction reactions is produced in the form of very small particles, typically smaller than 1 micron. Such small particles are extremely reactive, and unless extraordinary, and currently expensive procedures are employed in subsequent processing to ingot form, the particles become unacceptably contaminated with oxygen and nitrogen, rendering the product metal unsuitable for use without further processing.

All three problems, to date, have delayed industrial acceptance of a flame reduction process for the metal halides identified herein. No prior process successfully addresses the destructive effects of either the high temperatures required to produce a vaporous flow of the metallic reducing agent, or the even higher temperatures generated by the intense exothermicity of the reaction.

Those prior art flame reduction processes that have effectively collected the sub-micron product metal particles, have done so by attempting to capture the submicron product metal particles in a liquid pool of the product metal. Two variations to the solution of this last problem are evident in the prior art.

In the first variation, it is claimed that the intense exothermicity of the reaction is sufficient to maintain a pool of liquid product metal in a bottomless crucible or hearth. As the sub-micron particles of product metal accumulate in the pool, a solidified ingot is withdrawn from the bottom of the crucible, thereby maintaining a constant liquid pool location. Although this is the most attractive solution, it neglects the great amount of heat which is typically removed from the crucible by water cooling.

Many of the metals listed herein are extremely reactive when molten, vigorously attacking or dissolving the available structural solids. These metals may only be contained within a frozen layer, or "skull", of the same metal. Typically, a crucible for the containment of these liquid metals consists of a cylindrical water cooled copper sleeve, which may be 2–30in diameter and ¼ to 1½" thick. Molten metal which touches the water cooled sleeve freezes instantly, thus providing the "skull" effect of a container of the same metal.

To achieve the "skull" effect, a great deal of heat must be removed from the liquid pool of the product metal to provide for a frozen layer of the product metal in contact with the water cooled crucible. In practice, as those skilled in the art of extractive metallurgy are aware, this amount to maintain the pool and the skull is typically several times over the amount of heat generated by flame reduction. In order to produce a homogeneous ingot of the product metal, the water cooling necessary for practical reasons will remove too much heat, and a liquid pool cannot be sustained.

The second prior art variation for maintaining a pool of liquid product metal which will serve to collect sub-micron metal produced in a flame reduction reaction into the form of a homogeneous ingot has been to supply extra heat to the pool of liquid product metal by arc melting a rod or bar of the product metal into the pool while the flame reduction reaction occurs. This is described by Findlay in U.S. Pat. No. 2,828,199. Although this method is indeed capable of supplying the necessary extra heat to maintain a pool of liquid product metal in a water cooled crucible, it has been found that the arc dynamics interfere with the flame reduction reaction to an extent that renders this method unacceptable.

As known to those skilled in the art of arc melting, an arc discharge generates extremely high temperatures, up to and beyond 10,000° C. The intense heating causes vigorous convective circulation currents, which greatly interfere with the flame reduction reaction. The result is that the sub-micron product metal cannot be efficiently deposited onto the surface of the liquid pool. Rather, a large percentage of the metal is transported away from the pool by arc-induced gas flows. Thus, this approach does not solve the problem of how to maintain a pool of liquid product metal in a water cooled crucible, where said pool is necessary to efficiently capture sub-micron product metal produced in a flame reduction reaction to produce a homogeneous ingot of product metal.

To summarize the prior art in flame reduction processes, although the chemical reactions occur favorably, there has not yet been a reactor design which mitigates the problems of the high temperatures employed and generated, nor which successfully captures the sub-micron particles produced to form a homogenous ingot of product metal.

OBJECTS OF THE INVENTION

Accordingly, the main object of this invention is to provide an apparatus and an industrial process whereby metal halides may be reduced to product metal by metallic reducing agents on a rapid and continuous basis without encountering the drawbacks of the prior flame reduction process. It is a further object to produce the product metal in the form of a homogeneous ingot. A further object is to use the metallic reducing agent more efficiently than do present methods for producing the metals Hf, Nb, Si, Ta, Ti, V, and Zr. Other objects will become apparent as the invention is described fully below.

SUMMARY OF THE INVENTION

In the practice of the present invention Vaporized Metal Halides are contacted with liquid phase metallic reducing agents over an induction heated molten pool of elemental metal produced by the exothermic reaction of the metal halide and aerosolized droplets of the metallic reducing agent.

Three general requirements must be met for the present invention to be useful in the case of a specific metal halide and a specific metallic reducing agent: i.e., 1) The metal halide must be vaporizable at a reasonable, industrially achievable temperature for example 800° C. or below, and must have a vapor pressure in excess of one atmosphere at 800° C.; 2) the metallic reducing agent must have a melting point below a temperature of about 800° C., and must be capable of being sprayed through a fog nozzle or otherwise converted into an aerosol; and 3) the metallic reducing agent must react sufficiently exothermically with the metal halide so that the reaction occurs very rapidly.

DETAILED DESCRIPTION OF THE PREFERRED EMBODIMENT OF THE INVENTION

Figure 1:
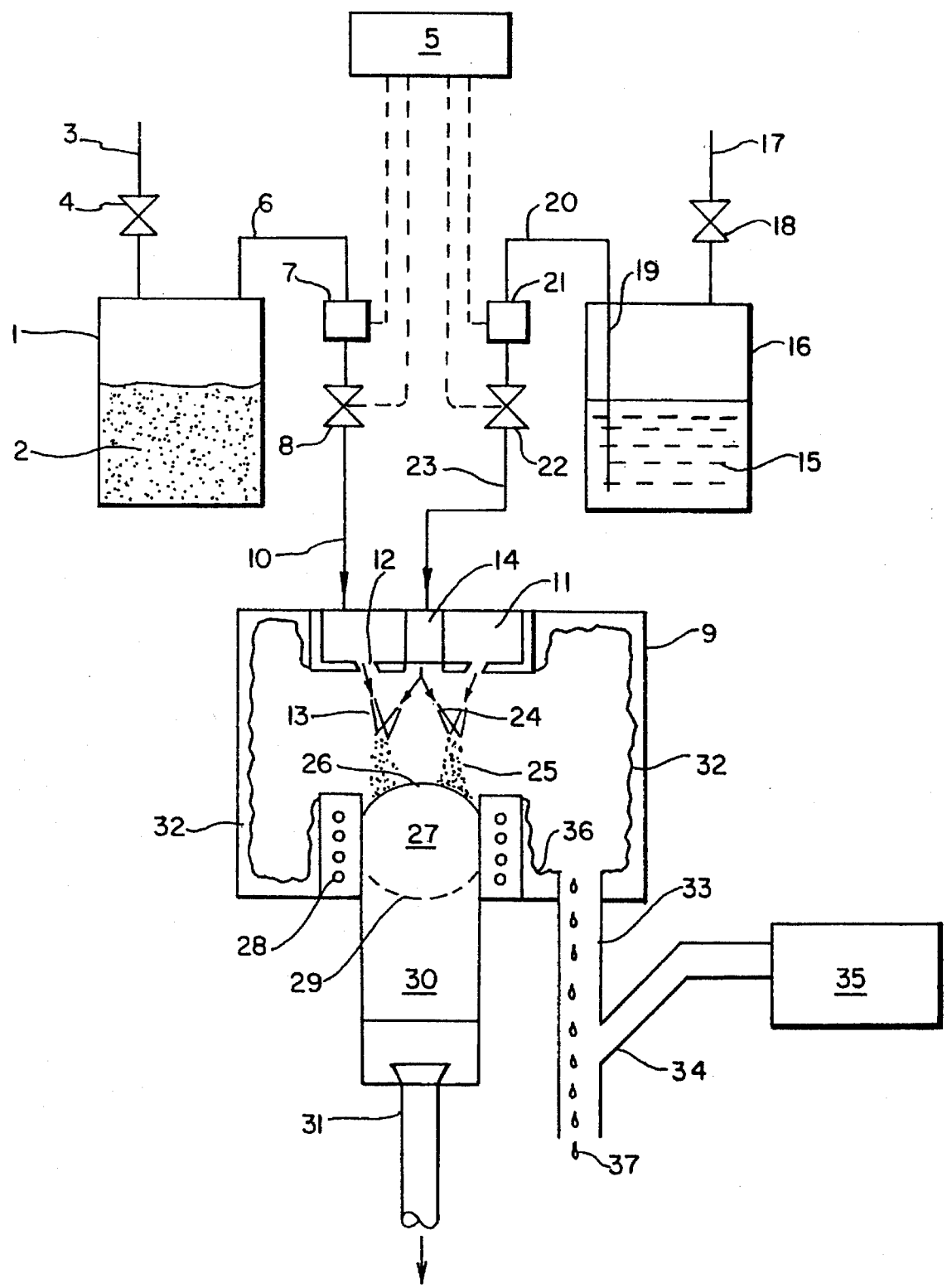
FIG. 1 represents a process schematic, of a preferred embodiment of this invention.

With reference to FIG. 1, and without intending to limit the scope, a specific embodiment of the invention is described hereinafter. A metal halide vessel, 1, contains the metal halide 2 to be reduced to metal by the process of the invention. The metal halide may be a solid, a liquid, or a gas; a solid such as $ZrCl_4$ is represented. The metal halide vessel may be filled and evacuated through conduit 3 and valve 4. The temperature within the metal halide vessel may be monitored by a standard thermocouple (TC), not shown, and the vapor pressure within the vessel may be calculated by means known to those skilled in the art. The metal halide TC is connected to process control computer 5, by a connection which is not shown.

The metal halide vessel is heated by a furnace, not shown, to produce a vapor pressure of the metal halide on the order of one atmosphere within the vessel. The temperature required will depend on the particular metal halide to be reduced, as known to those skilled in the art of extractive metallurgy. The metal halide furnace is controlled by process control computer 5, which controls the furnace in order to maintain the required temperature within the metal halide vessel.

The metal halide vapors are conducted through conduit 6, to a high temperature Coriolis type mass flow meter 7, such as manufactured by Micro Motion, Inc. The signal from the mass flow meter is fed to process control computer 5, which also controls high temperature flow metering gate valve 8, such as manufactured by the Smith Valve Company, located downstream from the mass flow meter. By these means, a constant mass flow rate of metal halide vapor may be supplied to the reactor 9. A constant and controllable flow of both the metal halide vapor and the metallic reducing agent is necessary for uniformity of the product and for economical operation.

From the control valve 8, the metal halide vapors continue through conduit 10 to the reactor 9. In the reactor, the vapors enter an annular plenum space 11, then flow through nozzle holes 12, which form a convergent, conical flow pattern 13 centered on the reductant spray nozzle 14.

The metallic reducing agent 15, for example, sodium, is contained in the metallic reducing agent vessel 16, which is heated by a furnace, not shown, which is monitored by process control computer 5. The process control computer controls the furnace to maintain the required temperature within the reducing agent vessel. Typically this temperature is about equal to the temperature of the metal halide to be reduced; it must always be above the melting point of the metallic reducing agent.

The metallic reducing agent vessel may be filled and evacuated through conduit 17 and valve 18. When the reaction is to start, the metallic reducing agent is forced by inert gas pressure (such as argon or helium) imposed through conduit 17 (by means not shown) to flow through standpipe 19 in the metallic reducing agent vessel.

The metallic reducing agent flows through conduit 20 to reach mass flow meter 21. The signal from the mass flow meter is fed into the process control computer 5, which also controls flow metering valve 22, located downstream from the mass flow meter. By these means, a constant flow of metallic reducing agent may be supplied to the reactor 9.

From the control valve 22, the metallic reducing agent flows through conduit 23 to reach the reactor 9. In the reactor, the metallic reducing agent is forced through the reductant spray nozzle 14 (for example, a Bete fog nozzle) to form a divergent, conical aerosol spray pattern 24 of the metallic reducing agent. Other methods of creating aerosol spray patterns are known to those skilled in the art of fluid mechanics.

Reactor 9 is heated by a furnace, not shown, to an operating temperature which is approximately that of the metal halide vessel and the metallic reducing agent vessel. Within reactor 9, the convergent metal halide vapor flow 13 and the divergent aerosol metallic reducing agent flow 24 intersect to form a reaction zone 25, wherein the metal halide vapor is reduced to metal, and the corresponding halide of the metallic reducing agent is formed. For example, the metal halide $ZrCl_4$ is reduced by the metallic reducing agent Na according to the reaction:

$ZrCl_4(g)+4Na(l)\rightarrow Zr(s)+4NaCl(g)$ to form elemental Zr and the byproduct halide NaCl in vapor form.

Similar reactions occur for the metal halides and metallic reducing agents listed above which meet the requirements listed in the background.

In the reaction zone 25, sub-micron particles of the product metal (for example, Zr) are formed, as is, simultaneously, the vaporous byproduct halide of the metallic reducing agent (for example, NaCl). The sub-micron product metal coalesces on the surface 26 of a pool 27 of liquid product metal (for example, liquid Zr) and thereby becomes consolidated into the pool. The pool 27 of liquid product metal is maintained within the water-cooled crucible 28 of a cold wall induction furnace, the shell of which constitutes the reactor 9. The power supply and the induction coil which surrounds the crucible 28 are omitted for clarity.

Below the surface of the pool 26, the liquid product metal eventually freezes due to the water cooling of the crucible 28 below the active area of the induction coil, shown generally at 29, as is known to those skilled in the art of cold wall induction melting. The homogeneous, solid product metal ingot 30 is continuously withdrawn or retracted from the crucible 28 by withdrawal means 31, as known to those skilled in the art of melting reactive metals.

The byproduct metal halide vapors (for example, NaCl) will condense as a solid on any surface which is below the melting point of the byproduct metal halide. For the $ZrCl_4$+ Na example, NaCl will condense as a solid on any surface below about 880° C. Hence, layers 32 of condensed byproduct halide will accumulate on the inside surface of the reactor 9 and on the outside surface of the cold wall induction crucible 28. The general area near to the reaction zone 25 is kept hot due to the exothermicity of the reaction, and thus no layer of byproduct metal halide builds up in the vicinity of the reaction zone 25.

The solid layer of frozen byproduct metal halide serves as a thermal insulator, and eventually a thick enough layer will accumulate that the interior surfaces 36 remain liquid. The liquid byproduct metal halide 37 is drained through conduit 33 into a receiver which is not shown. Vacuum conduit 34 intersects drain conduit 33, and leads to vacuum pumping system 35, which is used to initially evacuate the reactor, the various conduits, and the reactant vessels prior to the commencement of the reaction. It will be appreciated by those skilled in the art of fluid mechanics that the vacuum pumping system 35 creates the pressure differential which drives the flow of the metal halide and the metallic reducing agent.

It may be seen that the heat generated by the exothermic flame reduction reaction at steady state is dissipated or removed by a combination of cooling through the reactor wall 9 and by the removal of heat through the cooling water flowing in the cold wall induction crucible 28. The furnace (not shown) which heats reactor 9 is only needed for the start of the reaction. After steady state is achieved, additional heat input from the furnace is not necessary.

Thus, a continuous method for the reduction of metal halides by aerosol metallic reducing agents, and the consolidation of the sub-micron product metal particles into a homogeneous ingot is described. In the case of the $ZrCl_4$+ 4Na reaction, the metal halide vessel 1 should operate at a temperature of about 380° C., the metallic reducing agent vessel 16 should operate at approximately the same temperature, and the reactor 9 should also operate at about 380° C. The temperature in the reaction zone 25 will reach about 1200° C. as those skilled in the art of extractive metallurgy may calculate. The pool of liquid Zr 27 will be maintained at a temperature of about 1900° C., and the condensed NaCl will remain liquid above about 880° C., prior to being drained out.

EXAMPLE 1

An experimental apparatus similar to that illustrated in FIG. 1 was used in the production of Zr according to the invention. The experimental apparatus did not include a cold wall induction furnace to collect the product metal; rather, all of the reaction products were collected in an array of screens, and the Zr product was separated from the byproduct NaCl by dissolution in water. The experimental apparatus also did not incorporate a process control computer nor mass flow meters. Instead, the temperatures were controlled manually, and the flowrates controlled by empirical methods known to those skilled in the art of fluid mechanics.

In the experimental apparatus, the $ZrCl_4$ was maintained at a temperature of about 380° C., and was caused to flow through a high temperature, stainless steel pressure regulator which maintained a pressure of one atmosphere in the plenum chamber. Downstream from the plenum chamber, the $ZrCl_4$ vapor flowed through six holes, roughly 0.080 inches in diameter, to form a convergent conical spray pattern about 1½' in diameter at the base.

Liquid sodium, also at about 380° C., was sprayed through a model PJ-15 fog nozzle produced by the Bete Fog Nozzle company. The spray pattern was divergent conical spray pattern, and the flow intersected the flow of $ZrCl_4$ in a region about one inch below the plenum wall, and about one inch in diameter. An inert gas pressure of about 35 psig of argon was imposed on the pool of liquid sodium in order to drive the flow.

The nozzle holes through which the $ZrCl_4$ flowed, the size of the Bete fog nozzle, and the pressure above the pool of liquid sodium were sized such that elemental Zr was produced at a rate of about 1/10 pound per minute. A thermocouple located in the reaction zone registered temperatures in excess of 1050° C. indicating the exothermicity of the reaction. When viewed through a porthole in the apparatus, visible light was seen to be emitting from the reaction zone. Zr produced by the experimental apparatus was analyzed, and found to be of good purity.

Referring to U.S. Pat. No. 5,147,451 which is hereby incorporated by reference in its entirety, a process is disclosed in which byproduct $MgCl_2$ is separated from elemental Zr within the crucible of a cold wall induction furnace. This shows that indeed liquid elemental Zr may exist in the same environment as does the vaporous byproduct metal halide.

In the instant invention, the metallic reducing agent is not vaporized, but is instead converted into an aerosol, at a temperature above the melting point of the reducing agent, but no nearly so high as its boiling point. For example, the metallic reducing agent may be sprayed through a fog nozzle, of a design known to those skilled in the art of fluid mechanics. By introducing the metallic reducing agent in this physical form, two advantages accrue.

The first advantage of using an aerosol metallic reducing agent is that the apparatus need not operate at temperatures which are unreasonably high by industrial standards; unreasonably high temperatures are necessary in the case of vaporized metallic reducing agents. The second advantage of using an aerosol metallic reducing agent is that, since the metallic reducing agent reacts in the form of minute liquid droplets (on the order of 50 microns), much of the intense exothermic heat generated by the reaction is absorbed and attenuated by the liquid droplets. Some percentage of the droplets will vaporize, and in so doing, the ultimate temperature of the reaction may be kept low enough that the apparatus will have a useful life of many months instead of only the several minutes now experienced.

The second difference between the instant invention and prior art flame reduction processes lies in how the submicron product metal which is produced in this aerosol flame reduction process is collected. In the instant invention, a pool of liquid product metal is maintained within the crucible of a cold wall induction furnace. The cold wall induction furnace supplies the heat necessary to maintain a pool of liquid product metal in a water cooled crucible, and this pool serves to absorb the sub-micron product metal particles produced by the flame reduction reaction, ultimately forming a homogeneous ingot.

Induction melting furnaces have been employed for many years in the production of most common metals, but not in the production of the metals identified herein. Ordinary induction melting furnaces employ crucibles constructed of refractories like $MgO$, $SiO_2$, and $Al_2O_3$, which are dissolved by the metals listed, as described above. Some 30 years ago, however, an induction furnace capable of melting even the most reactive of metals was developed by Clites, as described in U.S. Bureau of Mines Bulletin 673.

The original cold wall induction furnace required the use of a slag material (itself a metal halide), which often led to objectionable inclusions of the slag; for this reason, cold wall induction melting was not initially adopted by industry. Recently however, Stickle et al found that the slag was not necessary. This is described in U.S. Pat. No. 4,738,713. Since that time, the use of cold wall induction melting has been slowly accepted. It has been mostly used in the melting or remelting and alloying of the metals listed herein; rarely for their initial production as in the instant invention. Traut describes a method of producing Ti and Zr which uses a cold wall induction furnace in U.S. Pat. No. 4,985,069 and 5,071,472, but it is substantially different from the instant invention. Cold wall induction melting equipment and processes are further described in U.S. Pat. Nos. 3,223,519; 3,775,091; 4,058,668; 4,838,933; and 4,923,508.

Cold wall induction melting solves another problem which has plagued prior art flame reduction processes. It has been found to be relatively easy to supply sufficient heat energy to maintain a pool of liquid product metal within a water cooled crucible. Furthermore, since no arc or related convective heat transfer mechanism is employed, there are no complicated gas flows to interfere with the reduction reaction. All of the sub-micron product metal may be efficiently deposited onto the top of the liquid pool of product metal maintained in the cold wall induction furnace crucible. A homogeneous ingot can then be extracted continuously from the bottom of the crucible.

Thus, the following contrasts may be seen: in prior art flame reduction processes, it was attempted to maximize the reaction temperature in order to minimize the amount of additional heat required to maintain a pool of liquid product metal, said pool to be used to collect the sub-micron metal produced in the flame reduction reaction. Contrary to that prevailing wisdom, the present invention deliberately seeks to lessen the reaction temperature in order to preserve the equipment. The deficiency in heat is made up for by the cold wall induction furnace, used to maintain a pool of liquid product metal which collects the submicron product metal produced in the flame reduction reaction.

It will be clear to those skilled in the various relevant arts that numerous variations on the apparatus are possible without changing the scope of the invention, which includes the use of an aerosol reducing agent to reduce a vaporizable metal halide, and the collection of the product sub-micron particles in a liquid pool of the product metal which is maintained in a cold wall induction furnace.

I claim:

1. A method of continuously producing a metal product selected from the group consisting of zirconium, hafnium, titanium, niobium, vanadium, silicon and tantalum by reduction of the corresponding metal halide with a metallic reducing agent having a metal selected from the group consisting of aluminum, calcium, magnesium and sodium, comprising the steps of:

(a) contacting in a reactor the metal halide with the metal reducing agent at a temperature below the vaporization temperature of the metal reducing agent and above the vaporization temperature of the metal halide; and (b) recovering from said reactor the metal product by collecting the metal which is formed in a pool of molten product metal contained in a cold wall induction heated receptacle in the reactor and removing the metal product.

2. The method of claim 1, wherein the metal halide selected has a vapor-pressure of at least one atmosphere at a temperature not in excess of about 800° C.

3. The method of claim 2, wherein the metallic reducing agent has a melting point at a temperature lower than about 800° C.

4. The method of claim 1, wherein the product metal is continuously withdrawn in a solid ingot form from said receptacle.

5. The method of claim 1, wherein zirconium chloride is reacted with sodium metal at an initial temperature of about 380° C. to produce zirconium metal and sodium chloride.

6. The method of claim 1, wherein the flow into the reactor of the vaporized metal halide above its vaporization temperature and the metallic reducing agent below its vaporization temperature is controlled in preselected amounts.

7. The method of claim 1, wherein the flow into the reactor of the two reactants is controlled to about stoichiometric reaction amounts.

8. The method of claim 1, wherein the metallic reducing agent is introduced in the reactor in an aerosol form.

9. A system for continuously producing a metal product selected from the group consisting of zirconium, hafnium, titanium, niobium, vanadium, silicon and tantalum, by reduction of the corresponding metal halide with a metallic reducing agent having a metal selected from the group consisting of aluminum, calcium, magnesium and sodium, said system consisting essentially of:

a) first container means for containing and vaporizing the selected metal halide, b) second container means for containing and melting the selected metallic reducing agent, c) reactor means capable of being maintained at a temperature and pressure sufficient to maintain the selected metal halide in vapor form and the metallic reducing agent in liquid or vapor form during the reduction reaction to produce liquid product metal and metallic reducing agent metal halide in the vapor form, d) first transfer means for conveying the selected metal halide vapor to said reactor means and second transfer means for conveying the selected metallic reducing agent in liquid form to said means, e) flow control means associated with each of said first and second transfer means for metering the flow of vaporized metal halide and liquid metallic reducing agent in preselected amounts into said reactor means, f) cold wall induction means located in said reactor means for collecting molten product metal in isolation from the structural materials of said reactor means for containing said product metal, and g) removal means for withdrawing reacted metallic reduction agent halide from said reactor means.

10. The system of claim 9, further comprising continuous metal product withdrawing means associated with said cold wall induction heating means in said reactor means for continuously withdrawing solidified product metal from said reactor means.

* * * * *